(12) United States Patent
Nirmal et al.

(10) Patent No.: US 8,730,184 B2
(45) Date of Patent: May 20, 2014

(54) TOUCH SENSITIVE DEVICE WITH MULTILAYER ELECTRODE HAVING IMPROVED OPTICAL AND ELECTRICAL PERFORMANCE

(75) Inventors: Manoj Nirmal, St. Paul, MN (US); Stephen P. Maki, North St. Paul, MN (US); Donald J. McClure, Siren, WI (US); Joseph W. Woody, V, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 892 days.

(21) Appl. No.: 12/639,363

(22) Filed: Dec. 16, 2009

(65) Prior Publication Data

US 2011/0139516 A1    Jun. 16, 2011

(51) Int. Cl.
G06F 3/041    (2006.01)
(52) U.S. Cl.
USPC ...................... 345/173; 178/18.01; 178/18.03
(58) Field of Classification Search
None
See application file for complete search history.

(56) References Cited

U.S. PATENT DOCUMENTS

| | | | |
|---|---|---|---|
| 5,440,446 A | 8/1995 | Shaw et al. | |
| 5,629,783 A | 5/1997 | Kanbara et al. | |
| 5,877,895 A | 3/1999 | Shaw et al. | |
| 6,010,751 A | 1/2000 | Shaw et al. | |
| 7,365,900 B2 | 4/2008 | Yamamoto | |
| 7,468,211 B2 | 12/2008 | McCormick et al. | |
| 7,495,280 B2 | 2/2009 | Lo | |
| 7,538,483 B2 | 5/2009 | Mikami | |
| 2001/0040733 A1 | 11/2001 | Toyoshima et al. | |
| 2003/0234769 A1 | 12/2003 | Cross et al. | |
| 2005/0083307 A1 | 4/2005 | Aufderheide et al. | |
| 2005/0126831 A1 | 6/2005 | Richter et al. | |
| 2005/0285846 A1* | 12/2005 | Funaki | 345/173 |
| 2006/0097991 A1 | 5/2006 | Hotelling et al. | |
| 2007/0132737 A1 | 6/2007 | Mulligan et al. | |
| 2008/0142352 A1* | 6/2008 | Wright | 200/600 |
| 2009/0066670 A1 | 3/2009 | Hotelling et al. | |
| 2009/0278815 A1* | 11/2009 | Li et al. | 345/174 |
| 2009/0316060 A1 | 12/2009 | Nirmal et al. | |
| 2010/0300773 A1 | 12/2010 | Cordeiro et al. | |
| 2011/0036391 A1 | 2/2011 | McCormick et al. | |
| 2011/0115717 A1 | 5/2011 | Hable et al. | |

OTHER PUBLICATIONS

Form PCT/ISA/210, PCT International Search Report, International Application No. PCT/US2010/058183, International Filing Date; Nov. 29, 2010. (5 pages).
U.S. Appl. No. 61/182,366, "High-Speed Multi-Touch Touch Device and Controller Therefor", filed May 29, 2009.

* cited by examiner

*Primary Examiner* — Adam R Giesy
(74) *Attorney, Agent, or Firm* — Kristofor L. Storvick (57) ABSTRACT

A touch sensor including one or more multilayer electrodes, said electrodes including at least two transparent or semi-transparent conductive layers separated by a transparent or semitransparent intervening layer. The intervening layer includes electrically conductive pathways between the first and second conductive layers to help reduce interfacial reflections occurring between particular layers in devices incorporating the conducting film or electrode.

16 Claims, 5 Drawing Sheets

TOUCH SENSITIVE DEVICE WITH MULTILAYER ELECTRODE HAVING IMPROVED OPTICAL AND ELECTRICAL PERFORMANCE

CROSS REFERENCE TO RELATED APPLICATIONS

This application is related to U.S. patent application Ser. No. 12/540,394, "Conducting Film or Electrode with Improved Optical and Electrical Performance for Display and Lighting Devices and Solar Cells," filed Aug. 13, 2009; and U.S. patent application Ser. No. 12/141,544, "Conducting Film or Electrode with Improved Optical and Electrical Performance," filed Jun. 18, 2008.

BACKGROUND

Touch screens offer a simple and intuitive way for users to interact with computing devices, often by signaling a command by touching a transparent touch sensor overlaid upon a display. Touch sensors are typically constructed of single-layer electrodes formed of a transparent conductive oxide.

SUMMARY

A touch sensor having one or more conducting multilayer electrodes, consistent with the present invention, includes a substrate and, for each multilayer electrode, two transparent or semitransparent conductive layers separated by a transparent or semitransparent intervening layer. The intervening layer, which helps reduce unwanted interfacial reflections occurring in a device incorporating this electrode, includes electrically conductive pathways between the two conductive layers. The intervening layer also improves the durability of the conductive layers under conditions of flexing and bending. Use of the intervening layer and the conductive pathways between the conductive layers allows for thinner individual conductive layers. The thinner individual conductive layers are more flexible than a single conductive layer of the same combined conductive layer thickness. Flexing a single thick conductive layer would cause cracking under conditions where the two thinner conductive layers would survive intact. The conductive pathways between the two conductive layers also provide redundant electrical pathways such that cracking in one conductive layer will not lead to overall loss of conductivity. In a single thick conductive layer, cracking can lead to open circuits and premature device failure. The intervening layers may be chosen to optimize the overall flexibility of the conducting film.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of the present invention relate to touch sensors having multilayer electrodes with improved electrical and optical properties. The electrodes can be used within any sensor or display where, for example, reflections resulting between layers are detrimental to device performance. The sensors may be disposed on any suitable substrate, such as glass or PET. The multilayer electrodes may also be incorporated into non-transparent touch sensors. The multilayer electrode patterns may embody bars, triangles, honeycombs, or any other suitable pattern. The sensors may be coupled to electronic components that detect changes in inter-electrode, or electrode-to ground capacitance, and thereby determine the coordinates of a touch or near touch.

The multilayer electrodes include two or more conductive layers having a particular refractive index with intervening conductive or insulating layers having a different refractive index and having electrically conductive pathways. The conductive layers and intervening layers are each transparent or semitransparent. The thicknesses of the individual layers and the optical indexes of refraction of the individual layers within the electrode stack are tuned to minimize unwanted Fresnel reflections when these substrates are incorporated within touch sensor. In one embodiment, the conductive layers of the multilayer electrode are symmetric, meaning they have the same thickness. In other embodiments, the conductive layers can have different thicknesses.

This multilayer electrode construction significantly improves the black level, color saturation, and hence the contrast of the display. In addition, the intervening layers permit electrical contact between the conductive layers of the electrode. As a result, the electrical conductivity of the multilayer electrode is higher than that of the individual conductive layers within the stack. Since the size of the touch sensor may be limited by the sheet resistance of the electrodes, the multilayer electrode enables the fabrication of larger touch sensors. Sensors fabricated using the multilayer electrodes exhibit significantly improved electrical and optical performance compared with devices having single layer electrodes.

Figure 1:
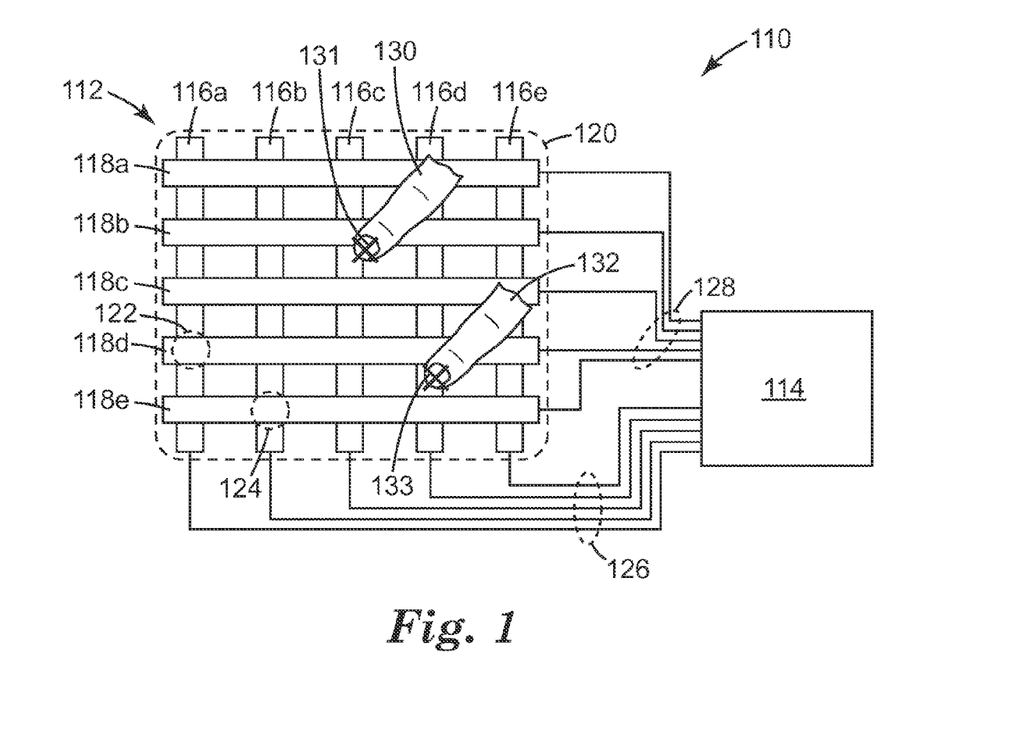
FIG. 1 shows a schematic view of a touch sensitive device and electronics.

In FIG. 1, an exemplary touch device 110 is shown. The device 110 includes a touch panel 112 connected to electronic circuitry, which for simplicity is grouped together into a single schematic box labeled 114 and referred to collectively as a controller. The touch panel 112 is shown for simplicity as having a 5×5 matrix of column electrodes 116a-e and row electrodes 118a-e, but other numbers of electrodes and other matrix sizes can also be used, as well as other electrode patterns, including non-matrix type patterns such as single, non-patterned layers as are used in surface capacitive type touch sensors. Multilayer electrodes as described herein may, in some embodiments enable very large capacitive-based multi-touch sensors, due to reduced resistance and increased signal to noise ratios.

The multilayer electrodes on panel 112 have a construction disclosed herein that yields improved electrical and optical properties. The panel 112 is typically substantially transparent so that the user is able to view an object, such as the pixilated display of a computer, television, hand-held device, mobile phone, or other peripheral device, through the panel 112. The boundary 120 represents the viewing area of the panel 112 and also preferably the viewing area of such a display, if used. The multilayer electrodes 116a-e, 118a-e are spatially distributed, from a plan view perspective, over the viewing area 120. For ease of illustration the multilayer electrodes are shown to be wide and obtrusive, but in practice they may be relatively narrow and inconspicuous to the user. Further, they may be designed to have variable widths, e.g., an increased width in the form of a diamond- or other-shaped pad in the vicinity of the nodes of the matrix in order to increase the inter-electrode fringe field and thereby increase the effect of a touch on the electrode-to-electrode capacitive coupling. From a depth perspective, the column electrodes may lie in a different plane than the row electrodes (from the perspective of FIG. 1, the column multilayer electrodes 116a-e lie underneath the row multilayer electrodes 118a-e) such that no significant ohmic contact is made between column and row electrodes, and so that the only significant electrical coupling between a given column electrode and a given row electrode is capacitive coupling. The matrix of multilayer electrodes typically lies beneath a cover glass, plastic film, or the like, so that the electrodes are protected from direct physical contact with a user's finger or other touch-related implement. An exposed surface of such a cover glass, film, or the like may be referred to as a touch surface. Configurations of touch sensitive devices other than matrix are also possible using the multilayer electrodes described herein. For example, capacitive buttons comprising two electrodes disposed on a surface to come sufficiently close to one another within the area of the button to have capacitive coupling. These two electrodes (one or both being multilayer electrodes) may be on the same plane, formed in the same layer as one another. Also, rather than the matrix (comprised of a plurality of electrodes), other configurations such as a single sheet-type electrode are also possible. Such sheet-type electrodes are sometimes used in surface capacitive type sensors, and the electrode is an un-patterned coating that substantially covers the entire touch surface. Generally speaking, most known electrode configurations are possible using the multilayer electrodes described herein.

In exemplary embodiments some or all of multilayer electrodes (116a-e, 118a-e) may be composed of two or more conductive layers having a particular refractive index and an intervening conductive layer having a different refractive index and having electrically conductive pathways.

The capacitive coupling between a given row and column electrode is primarily a function of the geometry of the electrodes in the region where the electrodes are closest together. Such regions correspond to the "nodes" of the electrode matrix, some of which are labeled in FIG. 1. For example, capacitive coupling between column multilayer electrode 116a and row multilayer electrode 118d occurs primarily at node 122, and capacitive coupling between column multilayer electrode 116b and row multilayer electrode 118e occurs primarily at node 124. The 5×5 matrix of FIG. 1 has 25 such nodes, any one of which can be addressed by controller 114 via appropriate selection of one of the control lines 126, which individually couple the respective column multilayer electrodes 116a-e to the controller, and appropriate selection of one of the control lines 128, which individually couple the respective row multilayer electrodes 118a-e to the controller.

In a mutual capacitance-type system, when a finger 130 of a user or other touch implement comes into contact or near-contact with the touch surface of the device 110, as shown at touch location 131, the finger capacitively couples to the electrode matrix. The finger draws charge from the matrix, particularly from those electrodes lying closest to the touch location, and in doing so it changes the coupling capacitance between the electrodes corresponding to the nearest node(s). For example, the touch at touch location 131 lies nearest the node corresponding to multilayer electrodes 116c/118b. Preferably, the controller is configured to rapidly detect the change in capacitance, if any, of all of the nodes of the matrix, and is capable of analyzing the magnitudes of capacitance changes for neighboring nodes so as to accurately determine a touch location lying between nodes by interpolation. Furthermore, the controller 114 advantageously is designed to detect multiple distinct touches applied to different portions of the touch device at the same time, or at overlapping times. Thus, for example, if another finger 132 touches the touch surface of the device 110 at touch location 133 simultaneously with the touch of finger 130, or if the respective touches at least temporally overlap, the controller is preferably capable of detecting the positions 131, 133 of both such touches and providing such locations on a touch output 114a.

Many possible drive and detection routines are possible and known in the art. A capacitance-to-ground type system measures changes in capacitance to ground occurring near nodes of the electrode matrix, rather than capacitance between electrodes.

Figure 2:
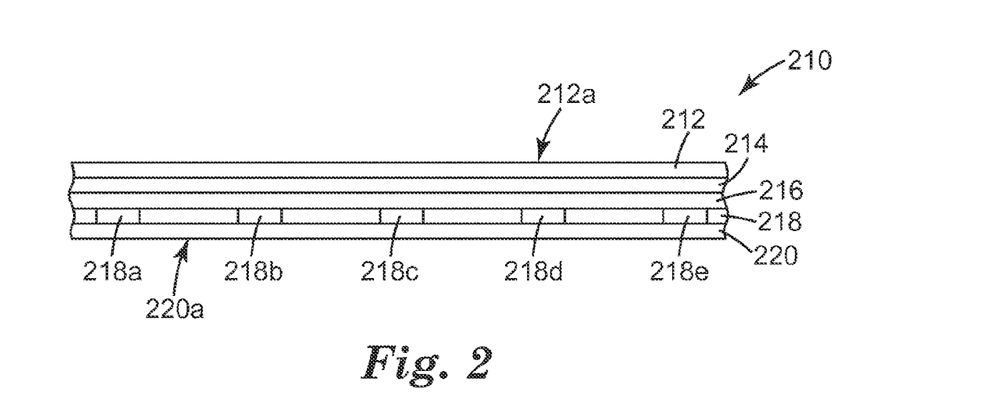
FIG. 2 shows a cross section of a portion of a touch panel used in an exemplary touch sensitive device.

Turning now to FIG. 2, we see there a schematic side view of a portion of a multilayer touch sensor 210 for use in a touch device, such as device 110 of FIG. 1. Touch sensor 210 includes upper layer 212 (which would be the layer closest to the user, and the upper surface 212a of which would define the touch area of a touch sensor), which could be glass, PET, or a durable coating. Upper electrode layer 214 comprises a first set of multilayer electrodes. Dielectric layer 216 separates upper electrode layer from lower electrode layer 218, which also comprises a set of multilayer electrodes 218a-e, which in one embodiment are orthogonal to the first set of electrodes. In other embodiments, the upper and lower electrodes are not orthogonal to one another. Lower layer 220 may, like the upper layer, be glass, PET, or other material. The exposed surface 212a of upper layer 212, or the exposed surface 220a of lower layer 220, may be or include the touch surface of the touch sensor 210. This is a simplified view of the stack that makes up the touch sensor; more or fewer layers and other intervening layers are possible.

Figure 3:
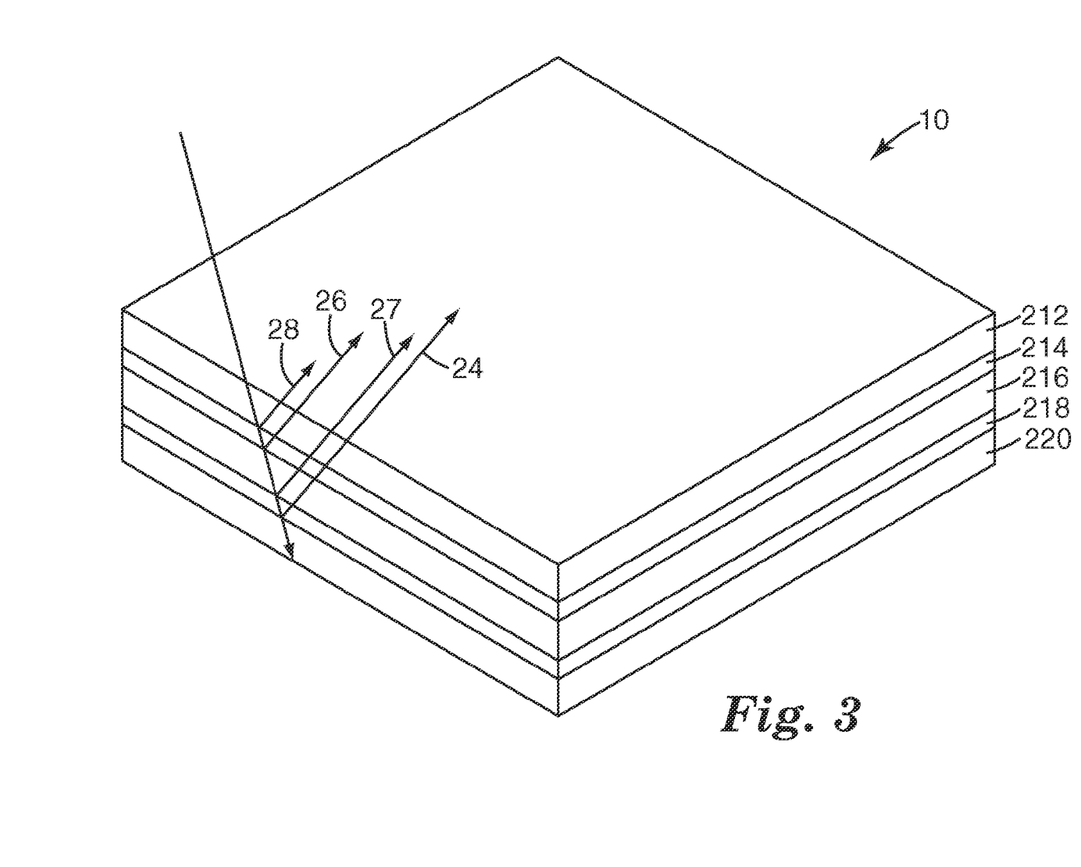
FIG. 3 shows a cross section of a portion of a touch panel used in an exemplary touch sensitive device.

Turning now to FIG. 3, we see sensor stack 10, a schematic three dimensional view of a portion of a multilayer touch sensor 210 for use in a touch device, such as device 110 of FIG. 1. The cross section of FIG. 3 corresponds to that which would be seen at, for example, node 122 or 124 of FIG. 1, and includes upper layer 212, electrode 214, dielectric layer 216, electrode 218, and lower layer 220. The light reflected by an electrode includes the planar reflection and unwanted Fresnel reflections at each layer interface due to refractive index mismatches, represented by reflections 24, 26, 27 and 28. Fresnel reflections are typically broadband and hence degrade the color saturation of the display. Light reflected by an electrode includes scattering and the interfacial Fresnel reflections. These reflections degrade the black level of an underlying display and hence the contrast ratio. They also make the electrodes within the sensor more noticeable to a user especially when the display is off or set to a single color in a region greater than an electrode.

The magnitude of the Fresnel reflection depends on the ratio of refractive indices at the interface. At normal incidence it is determined by the following equation:

$$R = \left(\frac{n-1}{n+1}\right)^2;$$
$$n = \frac{n_2}{n_1}$$

where n is the relative index of the two media with refractive indices n2, n1. Fresnel reflections are strongest at interfaces with the highest relative index. The refractive indices of the various layers of sensor stack 10 shown in FIG. 3 are the following: n=2.0 for the electrodes and n=1.65 for the substrate. In the sensor stack 10, the highest index step thus occurs at the interfaces between the high index indium tin oxide (ITO) and the polyethylene terephthalate (PET) substrate. Sensor stack 10 includes two ITO/PET interfaces. Depending on the illumination these interfaces can reflect a significant portion of the incident light and make the electrodes quiet noticeable to the user.

In comparison, the multilayer electrode design of embodiments of the present invention yields both good optical and electrical performance. The intervening dielectric layer in the multilayer electrode design is a transparent or semitransparent layer having electrically conductive pathways that enable electrical contact between the two conductive layers. The pathways may form naturally by controlling the thickness and deposition conditions of the intervening layer. The chemical and physical properties of the first conductive layer nearest the substrate may also be adjusted to enable formation of these pathways by changing the wetting properties of the intervening layer such that the intervening layer is discontinuous to allow electrical contact between the adjacent layers. Alternatively, the pathways could be created using techniques such as laser ablation, ion bombardment or wet/dry etching.

The intervening layer may be deposited using vapor deposition techniques such as sputtering, e-beam, and thermal evaporation. The intervening layer can include polymers, including copolymers, such as polyacrylates, polymethacrylates, polyolefins, polyepoxides, polyethers, and the like, and inorganic materials such as metal oxides, nitrides, carbides, and mixtures thereof. Preferred non conductive intervening layers include polyacrylates and silicon oxides. The intervening layer may also be formed using solution coating. An ultrabarrier film process, in which a monomer is evaporated onto the substrate and cured in-situ, may also be used. Ultrabarrier films include multilayer films made, for example, by vacuum deposition of two inorganic dielectric materials sequentially in a multitude of layers on a glass or other suitable substrate, or alternating layers of inorganic materials and organic polymers, as described in U.S. Pat. Nos. 5,440,446; 5,877,895; and 6,010,751, all of which are incorporated herein by reference as if fully set forth.

Figure 4:
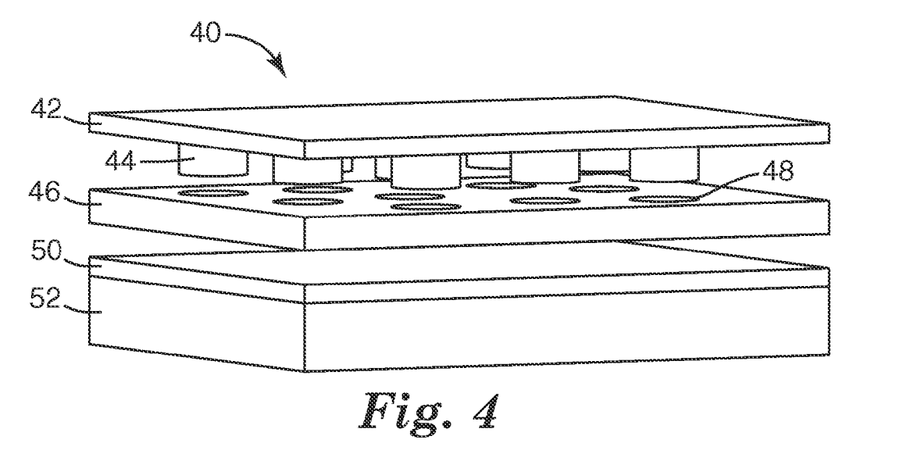
FIG. 4 is a diagram of a multilayer electrode having an intervening layer with conductive paths.

One embodiment is shown as a stack 40 of FIG. 4. The multilayer electrode includes two high index conductive layers 42 and 50 of transparent conductive oxide (TCO) or semitransparent conductive oxide separated by a lower index transparent or semitransparent layer 46 having electrically conductive pathways comprising conductive links 44 extending through apertures 48 in transparent layer 46 to connect the electrodes 42 and 50. A substrate 52 provides support for the electrode. The layers are drawn apart to illustrate the concept.

Figure 5:
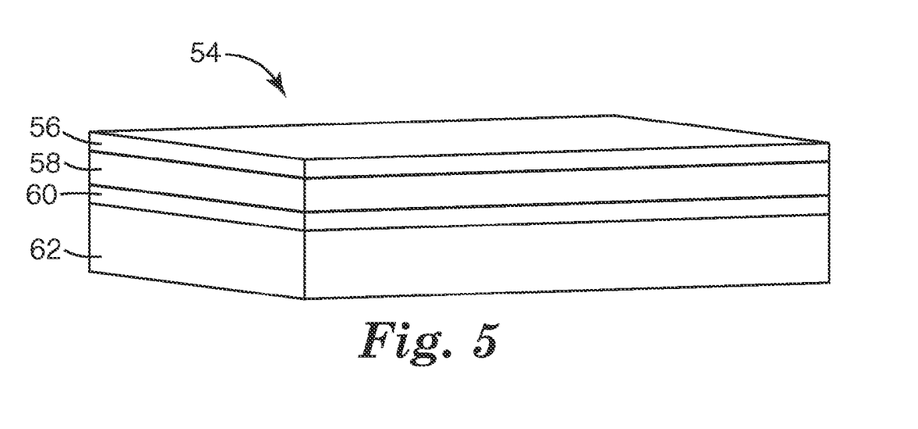
FIG. 5 is a diagram of a multilayer electrode having an intervening conductive layer.

In another embodiment, the intervening layer is a transparent or semitransparent conductor with a lower refractive index than the conductive layers on either side, as shown in stack 54 of FIG. 5. In the multilayer electrode included in stack 54, the intervening conductive layer 58 may provide continuous electrically conductive pathways between the two adjacent conductive layers 56 and 60 of TCO or semitransparent conductive oxide. A substrate 62 provides support for the multilayer electrode. The intervening layer 58 may comprise a solution coated or electro-deposited conductive polymer. It can also be a vapor deposited transparent conductor. Conducting polymers include the following exemplary materials: polyaniline; polypyrrole; polythiophene; and PEDOT/PSS (poly(3,4-ethylenedioxythiophene)/polystyrenesulfonic acid). The combined thickness of the conductive layers is constrained by the sheet resistance requirements while the thicknesses of the individual layers are optimized for the desired optical properties.

Figure 6:
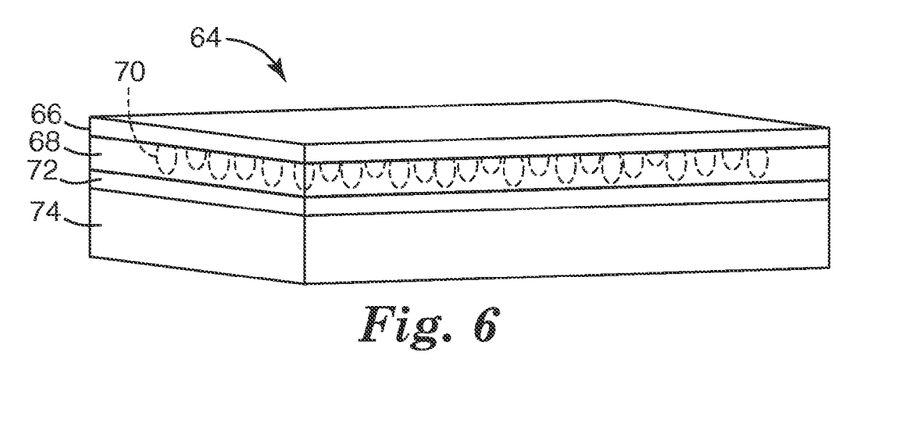
FIG. 6 is a diagram of a multilayer electrode having an intervening layer with conductive particles dispersed in a binder.

In yet another embodiment, the intervening layer comprises conductive particles dispersed in a binder, as shown in stack 64 of FIG. 6. The conductive particles 70 in binder 68 provide conductive pathways between the conductive layers 66 and 72 of TCO or semitransparent conductive oxide, thus forming the multilayer electrode. A substrate 74 provides support for the stack. The binder can be conductive or insulating. The conductive particles can be organic, inorganic, or metallic. Conductive particles also include metal coated particles. The refractive index of the intervening layer can be adjusted by varying the volume fractions of the binder and conductive particles.

The matrix and embedded conducting nanoparticles for the multilayer electrodes can include the following. The matrix can include any transparent or semitransparent (conductive or insulating) polymer (e.g., acrylates, methacrylates, or the conducting polymers listed above), or a transparent or semitransparent inorganic material either conductive (such as the TCOs listed above) or insulating ($SiO_2$, silicon nitride ($Si_xN_y$), Zinc Oxide ($Z_nO$), aluminum oxide ($Al_2O_3$), or magnesium fluoride ($MgF_2$)). The conducting nanoparticles can include conducting polymers such as those listed above, metals (e.g., silver, gold, nickel, chrome), or metal coated particles. If the matrix is conductive then the nanoparticles can be insulating, in particular they can be nanoparticles of the insulating materials listed above (e.g., $SiO_2$, silicon nitride, zinc oxide, or other insulating materials.)

Substrates for devices using the multilayer electrodes can include any type of substrate material for use in making a display or electronic device. The substrate can be rigid, for example by using glass or other materials. The substrate can also be curved or flexible, for example by using plastics or other materials. Substrates can be made using the following exemplary materials: glass; polyethylene terephthalate (PET); polyethylene napthalate (PEN); polycarbonate (PC); polyetheretherketone (PEEK); polyethersulphone (PES); polyarylate (PAR); polyimide (PI); poly(methyl methacrylate) (PMMA); polycyclic olefin (PCO); cellulose triacetate (TAC); and polyurethane (PU).

Other suitable materials for the substrate include chlorotrifluoroethylene-vinylidene fluoride copolymer (CTFE/VDF), ethylene-chlorotrifluoroethylene copolymer (ECTFE), ethylene-tetrafluoroethylene copolymer (ETFE), fluorinated ethylene-propylene copolymer (FEP), polychlorotrifluoroethylene (PCTFE), perfluoroalkyl-tetrafluoroethylene copolymer (PFA), polytetrafluoroethyloene (PTFE), polyvinylidene fluoride (PVDF), polyvinyl fluoride (PVF), tetrafluoroethylene-hexafluoropropylene copolymer (TFE/HFP), tetrafluoroethylene-hexafluoropropylene-vinylidene fluoride terpolymer (THV), polychlorotrifluoroethylene (PCTFE), hexafluoropropylene-vinylidene fluoride copolymer (HFP/VDF), tetrafluoroethylene-propylene copolymer (TFE/P), and tetrafluoroethylene-perfluoromethylether copolymer (TFE/PFMe).

Other suitable substrates include barrier films and ultrabarrier films. An example of a barrier film is described in U.S. Pat. No. 7,468,211, which is incorporated herein by reference as if fully set forth. Ultrabarrier films include multilayer films made, for example, by vacuum deposition of two inorganic dielectric materials sequentially in a multitude of layers on a glass or other suitable substrate, or alternating layers of inorganic materials and organic polymers, as described in U.S. Pat. Nos. 5,440,446; 5,877,895; and 6,010,751, all of which are incorporated herein by reference as if fully set forth.

TCOs for the multilayer electrodes include the following exemplary materials: ITO; tin oxides; cadmium oxides ($CdSn_2O_4$, $CdGa_2O_4$, $CdIn_2O_4$, $CdSb_2O_6$, $CdGeO_4$); indium oxides ($In_2O_3$, Ga, $GaInO_3$ (Sn, Ge), $(GaIn)_2O_3$); zinc oxides (ZnO(Al), ZnO(Ga), $ZnSnO_3$, $Zn_2SnO_4$, $Zn_2In_2O_5$, $Zn_3In_2O_6$); and magnesium oxides ($MgIn_2O_4$, $MgIn_2O_4$—$Zn_2In_2O_5$).

Figure 7:
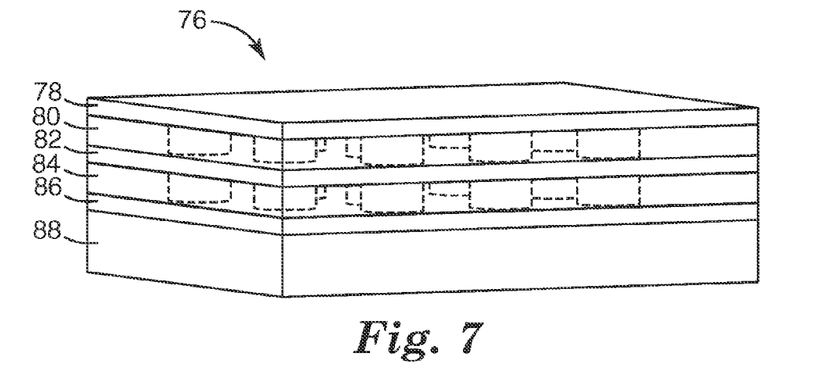
FIG. 7 is a diagram of a multilayer electrode having multiple intervening layers.
Figure 8A:
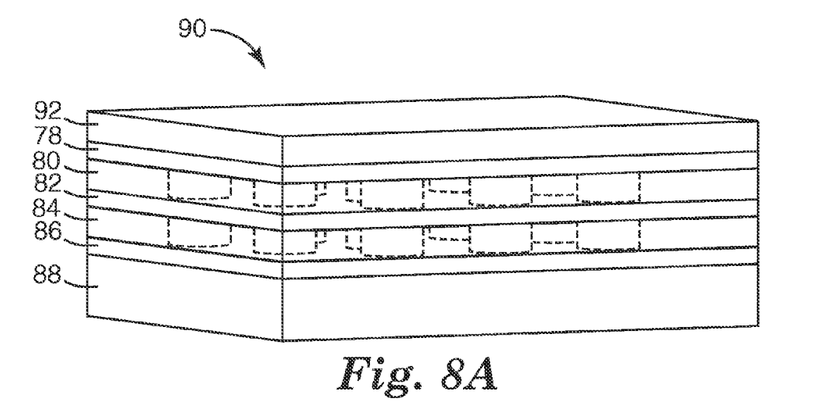
FIG. 8A is a diagram of a multilayer electrode having multiple intervening layers.

While the embodiments described above include two transparent or semitransparent conductive layers separated by an intervening layer, additional transparent or semitransparent conductive and intervening layers may be added depending on the desired optical and electrical properties, as shown in FIGS. 7 and 8A. Stacks 76 and 90 shown in FIGS. 7 and 8A include a substrate 88 and the following layers functioning as a single electrode: multiple transparent or semitransparent conductive layers 78, 82, and 86; intervening transparent or semitransparent layers 80 and 84 between the conductive layers. Additional layers of conductive layers and intervening layers can be added as well such that the electrode has any number of layers optimized or tuned for a particular device. It is also possible to incorporate the sensor onto the display stack, wherein the layer in contact with the display stack could be conductive or insulating as needed, as shown with respect to conductive layer 78 shown in FIG. 7 or an insulating layer 92 (such as an optically clear adhesive) shown in FIG. 8A. Furthermore, the multilayer electrode can be "tuned" to different optical properties for desired end uses. For example, the materials for the intervening layer, and the thicknesses of the layers, can be varied for a desired use or property, such as reducing reflection with a display is in the off state.

Figure 8B:
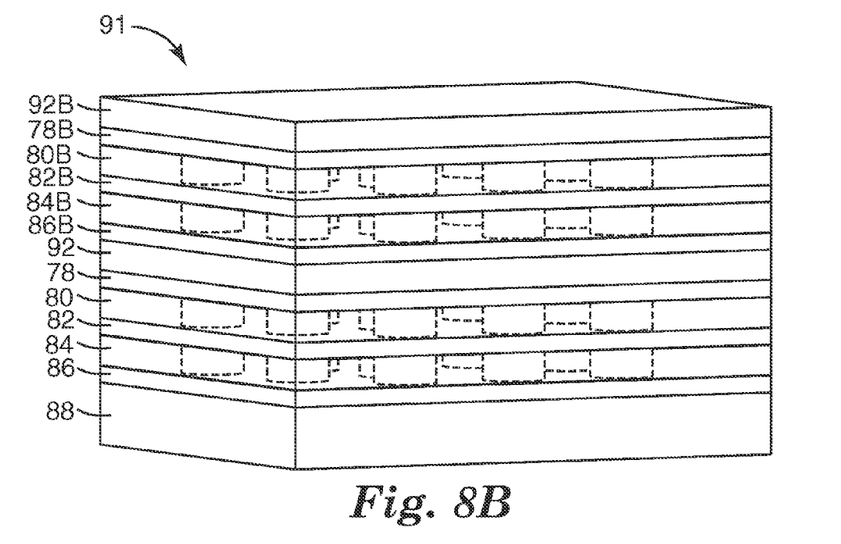
FIG. 8B is a diagram of a cross-section of a matrix-type touch screen at a node, showing an X-axis multilayer electrode having multiple intervening layers, and a Y-axis multilayer electrode having multiple intervening layers.

Whereas FIGS. 7 and 8A show a multilayer electrode having 3 conductive layers (and 2 intervening layers), FIG. 8B shows stack 91 from a cross section of a node on a matrix-type touch screen having X- and Y-electrodes, each electrode having a 3 conductive layer stack. Conductive layers 78, 82, and 86, in conjunction with intervening layers 80 and 84 comprise, for example, an X-axis electrode. Insulating layer 92, which could be a suitable optically clear adhesive, or a layer of PET, separates the X-axis electrode from the Y-axis electrode, which is comprised of conducting layers 78b, 82b, and 86b in conjunction with intervening layers 80b and 84b. While this construction is a 3 conductive layer per electrode, other arrangements are possible, such as 3 conductive layers for a given electrode, and greater then or less than 3 conductive layers for another electrode.

The multilayer electrodes can be used with other display devices such as electrophoretic devices (including use of Bridgestone's powder), polymer dispersed liquid crystal (PDLC) devices, and inorganic electroluminescence (IEL) displays and lighting devices. Examples of electrophoretic, PDLC, and IEL devices are described in, respectively, U.S. Pat. Nos. 7,365,900; 5,629,783; and 7,538,483, all of which are incorporated herein by reference as is fully set forth. Bridgestone's powder is described in the publication entitled "Quick Response—Liquid Powder Display (QR-LPD)" from Bridgestone Corporation and is also described in U.S. Pat. No. 7,495,820, which is incorporated herein by reference as if fully set forth.

Figure 9A:
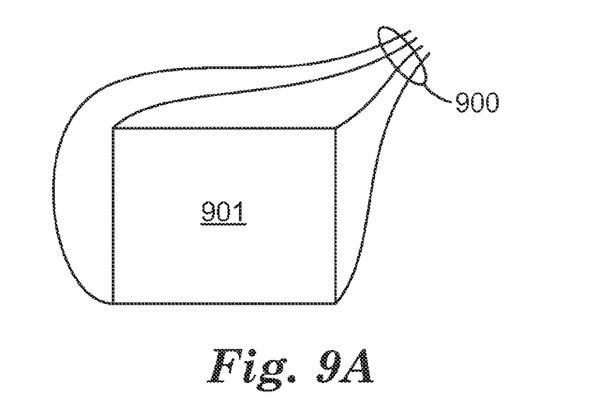
FIG. 9A-C show various patterns the which the multilayer electrodes may be embodied; and, FIG. 10 shows a plan view of a multilayer electrode pattern for a matrix-type touch screen prototype.
Figure 9B:
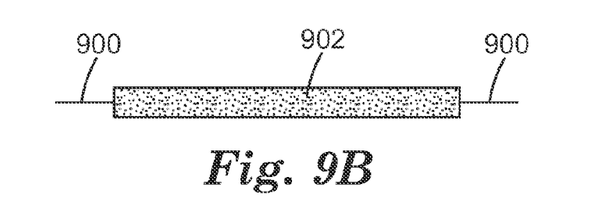
Figure 9C:
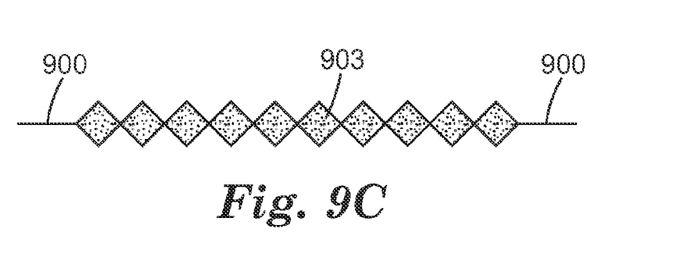

FIGS. 9a through 9c show various configurations of a multilayer electrode. FIG. 9a shows a sheet-type, un-patterned multilayer electrode 901, with wiring leads 900 connected to each corner. FIG. 9b shows a multilayer electrode 902 configured as a bar; FIG. 9c shows multilayer electrode 903 configured as repeating diamond shapes.

Example 1

Electrode substrates with the three-layer electrode design shown in FIG. 4 were fabricated with multiple parallel diamond-shaped electrodes, as shown in FIG. 9c. The three-layer electrode consisted of ITO(20 nm)/SiAlO$_x$ (42 nm)/ITO (20 nm), which were sputtered onto a roll of 0.005 inch (125 micrometer) thick PET.

The sheet resistance of these samples was measured to be approximately 123 ohms/square. The AC resistance measurements were measured according to the following procedure. The horizontal and vertical distances were measured on 10 sensor bars running horizontally and 10 running vertically, as shown in Table 1, below. Then a measurement was made for a rectangle of unpatterned ITO at the bottom of the vertical sensor sheet, as shown in Table 2, below. The measurements on the electrode substrates were taken using an Avant 600 ZIP from Optical Gaging Products Inc. of Rochester, N.Y., USA. The resistance measurements of the ITO bars and the ITO area were taken with a Fluke 77 Series II Multi-Meter (Fluke Corporation, Everett, Wash., USA.) To accurately measure the resistance of the ITO a piece of copper tape was connected to both ends. This piece of copper tape covered the entire width of the ITO area and provided a low resistance path to the higher resistance ITO. The resistance values were divided by the width, or average width in the case of the diamond pattern, to get the ohms/square. The 700 ohm measurement is a conservative measurement, due to the resistance of the z-axis adhesive connecting the copper tape, as well as to the small connection point of the probes.

TABLE 1

| Bar | Horizontal Bar R (kΩ) | Vertical Bar R (kΩ) |
| --- | --- | --- |
| 1 | 29.77 | 31.47 |
| 2 | 29.89 | 29.68 |
| 3 | 29.83 | 28.32 |
| 4 | 29.84 | 27.3 |
| 5 | 29.71 | 26.59 |
| 6 | 29.68 | 25.89 |
| 7 | 29.7 | 25.05 |
| 8 | 29.58 | 24.75 |
| 9 | 29.43 | 24.49 |
| 10 | 29.59 | 23.68 |

TABLE 2

| ITO Area Measurements | Horizontal | Vertical |
| --- | --- | --- |
| Length (mm) | 415.91 | 73.24 |

TABLE 2-continued

| ITO Area Measurements | Horizontal | Vertical |
|---|---|---|
| Squares | 5.68 | |
| Resistance (Ω) | 700 | |
| Resistance/Square (Ω/sq) | 123.27 | |

Figure 10:
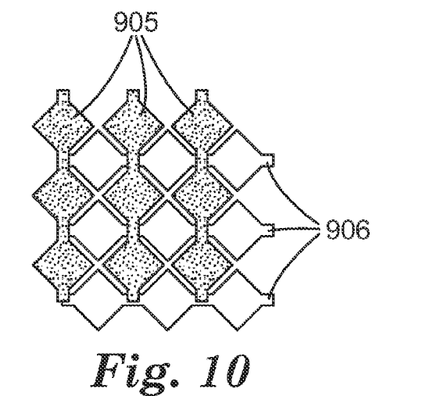

Touch sensors suitable for use over the front of a 19 inch diagonal computer monitor display were fabricated as follows: two sections of the electrode substrates were cut from the roll and laminated orthogonally, in registration, over each other on a glass substrate, using an optically clear adhesive (OCA), to form a matrix electrode sensor of the form shown in FIG. 10, which shows X-axis multi-layer electrodes 906 and Y-axis multi-layer electrodes 905. The sensor construction layers were then as follows: glass (which typically served as the touching surface, farthest from the underlying display), OCA, PET electrode substrate, OCA, and crossed PET electrode substrate. Most of the electrical testing was done on prototypes having the ITO electrodes on the PET surface facing away from the glass, which required another layer of OCA and unmodified PET over the crossed electrode substrate to protect the outermost ITO electrodes. Having the ITO electrodes facing away from the glass allowed easier connection to the electrode layers for prototype testing.

The percent optical transmission of both our prototype sensor (having multi-layer electrodes) and a similarly designed vendor-supplied sensor (part number 98-0003-3367-8, available from 3M Touch Systems, Methuen, Mass., USA) were 90% (measurements ranged from 89.8 to 90.1% optical transmission (% T)). These were measured on BYK Gardner haze-gard plus machines (Catalog No. 4725, from BYK-Gardner USA, Columbia, Md., USA) which provide photopic measurements using white light, averaged over all visible wavelengths. Percent reflection (% R) was also measured. Results are in Table 3:

TABLE 3

| Wavelength | Sensor | | PET with Conductor | |
|---|---|---|---|---|
| (nm) | % R | % T | % R | % T |
| 800 | 11.8 | 85.0 | 12.1 | 87.9 |
| 795 | 11.4 | 84.8 | 12.2 | 87.8 |
| 790 | 11.7 | 84.9 | 12.2 | 87.8 |
| 785 | 11.4 | 85.0 | 12.2 | 87.8 |
| 780 | 11.7 | 85.2 | 12.2 | 87.8 |
| 775 | 11.5 | 85.1 | 12.3 | 87.8 |
| 770 | 11.7 | 85.2 | 12.2 | 87.8 |
| 765 | 11.5 | 85.3 | 12.2 | 87.7 |
| 760 | 11.6 | 85.4 | 12.2 | 87.6 |
| 755 | 11.5 | 85.4 | 12.2 | 87.6 |
| 750 | 11.5 | 85.5 | 12.2 | 87.6 |
| 745 | 11.5 | 85.5 | 12.2 | 87.5 |
| 740 | 11.4 | 85.5 | 12.2 | 87.6 |
| 735 | 11.5 | 85.6 | 12.2 | 87.5 |
| 730 | 11.3 | 85.7 | 12.2 | 87.5 |
| 725 | 11.6 | 85.8 | 12.2 | 87.4 |
| 720 | 11.3 | 85.9 | 12.2 | 87.6 |
| 715 | 11.6 | 86.0 | 12.2 | 87.5 |
| 710 | 11.3 | 86.0 | 12.1 | 87.4 |
| 705 | 11.4 | 86.0 | 12.1 | 87.4 |
| 700 | 11.5 | 86.2 | 12.1 | 87.4 |
| 695 | 11.1 | 86.1 | 12.1 | 87.3 |
| 690 | 11.5 | 86.3 | 12.1 | 87.4 |
| 685 | 11.3 | 86.2 | 12.1 | 87.2 |
| 680 | 11.2 | 86.4 | 12.1 | 87.4 |
| 675 | 11.5 | 86.4 | 12.1 | 87.3 |
| 670 | 11.3 | 86.5 | 12.1 | 87.3 |
| 665 | 11.2 | 86.5 | 12.1 | 87.2 |

TABLE 3-continued

| Wavelength | Sensor | | PET with Conductor | |
|---|---|---|---|---|
| (nm) | % R | % T | % R | % T |
| 660 | 11.4 | 86.6 | 12.1 | 87.3 |
| 655 | 11.3 | 86.6 | 12.1 | 87.2 |
| 650 | 11.2 | 86.6 | 12.0 | 87.3 |
| 645 | 11.3 | 86.7 | 12.0 | 87.3 |
| 640 | 11.4 | 86.7 | 12.0 | 87.3 |
| 635 | 11.3 | 86.8 | 12.0 | 87.3 |
| 630 | 11.2 | 86.7 | 12.0 | 87.3 |
| 625 | 11.3 | 86.8 | 12.0 | 87.3 |
| 620 | 11.4 | 86.8 | 11.9 | 87.2 |
| 615 | 11.4 | 86.9 | 11.9 | 87.3 |
| 610 | 11.3 | 86.8 | 11.9 | 87.3 |
| 605 | 11.2 | 86.8 | 11.9 | 87.2 |
| 600 | 11.3 | 86.9 | 11.8 | 87.4 |
| 595 | 11.4 | 87.0 | 11.8 | 87.3 |
| 590 | 11.5 | 87.0 | 11.7 | 87.3 |
| 585 | 11.5 | 87.0 | 11.7 | 87.4 |
| 580 | 11.4 | 87.1 | 11.6 | 87.4 |
| 575 | 11.4 | 87.0 | 11.6 | 87.4 |
| 570 | 11.3 | 87.0 | 11.5 | 87.5 |
| 565 | 11.3 | 87.0 | 11.5 | 87.5 |
| 560 | 11.3 | 87.0 | 11.4 | 87.4 |
| 555 | 11.3 | 87.0 | 11.4 | 87.5 |
| 550 | 11.4 | 87.1 | 11.3 | 87.7 |
| 545 | 11.4 | 87.1 | 11.2 | 87.7 |
| 540 | 11.4 | 87.1 | 11.1 | 87.8 |
| 535 | 11.4 | 87.1 | 11.0 | 87.8 |
| 530 | 11.4 | 87.0 | 10.9 | 87.8 |
| 525 | 11.5 | 86.9 | 10.8 | 87.9 |
| 520 | 11.5 | 86.9 | 10.7 | 87.8 |
| 515 | 11.4 | 86.9 | 10.6 | 87.9 |
| 510 | 11.3 | 86.7 | 10.5 | 87.9 |
| 505 | 11.3 | 86.7 | 10.4 | 88.0 |
| 500 | 11.4 | 86.7 | 10.3 | 88.0 |
| 495 | 11.4 | 86.6 | 10.2 | 88.1 |
| 490 | 11.4 | 86.6 | 10.1 | 88.3 |
| 485 | 11.4 | 86.6 | 10.1 | 88.4 |
| 480 | 11.5 | 86.7 | 10.0 | 88.5 |
| 475 | 11.5 | 86.4 | 9.9 | 88.4 |
| 470 | 11.4 | 86.2 | 9.8 | 88.2 |
| 465 | 11.5 | 85.9 | 9.7 | 88.0 |
| 460 | 11.4 | 85.6 | 9.7 | 87.9 |
| 455 | 11.5 | 85.4 | 9.7 | 87.8 |
| 450 | 11.5 | 85.1 | 9.7 | 87.8 |
| 445 | 11.6 | 84.8 | 9.8 | 87.5 |
| 440 | 11.6 | 84.6 | 9.9 | 87.2 |
| 435 | 11.7 | 84.1 | 10.0 | 86.6 |
| 430 | 11.8 | 83.6 | 10.3 | 86.0 |
| 425 | 11.9 | 82.9 | 10.5 | 85.3 |
| 420 | 12.0 | 82.3 | 10.9 | 84.4 |
| 415 | 12.1 | 81.5 | 11.4 | 83.2 |
| 410 | 12.3 | 80.6 | 11.9 | 81.8 |
| 405 | 12.4 | 79.4 | 12.6 | 80.1 |
| 400 | 12.6 | 77.7 | 13.5 | 77.9 |
| 395 | 12.8 | 75.8 | 14.5 | 75.6 |
| 390 | 13.0 | 73.8 | 15.6 | 73.0 |
| 385 | 13.2 | 71.2 | 17.0 | 70.1 |
| 380 | 13.5 | 68.5 | 18.5 | 66.9 |
| 375 | 13.8 | 65.7 | 20.2 | 63.3 |
| 370 | 14.4 | 61.7 | 22.3 | 59.1 |
| 365 | 15.1 | 56.2 | 24.6 | 54.5 |
| 360 | 16.0 | 51.0 | 27.3 | 50.2 |
| 355 | 17.3 | 47.3 | 31.4 | 46.3 |
| 350 | 21.2 | 43.4 | 40.3 | 42.6 |
| 345 | 28.3 | 40.0 | 56.5 | 39.4 |
| 340 | 34.0 | 36.7 | 71.4 | 36.5 |
| 335 | 34.5 | 31.9 | 78.4 | 33.1 |
| 330 | 32.4 | 24.7 | 79.9 | 28.7 |
| 325 | 28.2 | 15.7 | 80.4 | 22.6 |
| 320 | 21.4 | 6.9 | 81.3 | 12.7 |

The three layer electrode design enables low sheet resistance in conjunction with good optical performance. Each intervening low index layer permits electrical contact between the adjacent transparent conductive layers. As a result the conductivity of the multilayer electrode is determined by the combined thickness of all the conductive layers. The 19 inch diagonal touch sensor described above had essentially the same (~90%) transmission as the vendor-sorced ~400 ohm/square ITO electrodes, yet the example sensor had a sheet resistance of only ~125 ohm/square, which enabled excellent sensor signal uniformity.

The above sensor was tested by attaching the two orthogonal sets of electrodes to a touch sensor controller and signal processing electronics, as described in commonly-assigned and co-pending patent application U.S. Ser. No. 12/618,874, Touch Sensitive Device Using Threshold Voltage Signal, filed Nov. 16, 2009. The touch sensor was placed on a foam pad, with the glass side up. At least 10 simultaneous finger touches on the glass could be accurately located by the sensor and displayed by the associated electronics.

Example 2

A 19 inch (diagonal) touch sensor made of two orthogonal sets of multilayer ITO/SiAlO$_x$/ITO stacks was fabricated on PET film in the same process as used for Example 1. The sensor was tested by attaching the two orthogonal sets of electrodes to a touch sensor controller and signal processing electronics, as described in commonly-assigned and co-pending patent application U.S. 61/182,366, High-speed Multi-touch Touch Device and Controller Therefor, filed May 29, 2009. At least 10 simultaneous finger touches on the glass could be accurately located by the sensor and displayed by the associated electronics.

It was found that the prototype sensors can provide increased conductivity and improved signal-to-noise, while maintaining the same percent optical transmission, as indicated by the optical measurements in Example 1, above.

The invention claimed is:

1. A sensor for use in a touch sensitive device, the sensor comprising one or more electrodes disposed on a substrate, at least one or more of the electrodes comprising: a first transparent or semitransparent conductive layer; a second transparent or semitransparent conductive layer; and a transparent or semitransparent intervening layer located between the first and second conductive layers, the intervening layer including electrically conductive pathways between the first and second conductive layers, such that when the sensor is used in a touch sensitive device, each of the first transparent or semitransparent conductive layer, second transparent or semitransparent conductive layer, and transparent or semitransparent intervening layer, together, function as a single electrode.

2. The sensor of claim 1, wherein the first and second conductive layers each comprise a transparent or semitransparent conductive oxide.

3. The sensor of claim 1, wherein the one or more electrodes comprises a single, un-patterned electrode.

4. The sensor of claim 1, wherein the one or more electrodes comprises patterned electrodes disposed on the substrate to form a matrix.

5. The sensor of claim 1, wherein the one or more electrodes comprises a first and second electrode disposed on the same layer.

6. The sensor of claim 1, wherein the intervening layer comprises a dielectric polymer or an inorganic dielectric material.

7. The sensor of claim 1, wherein the intervening layer comprises a conductive layer having an index of refraction different from the indexes of refraction of the first and second conductive layers.

8. The sensor of claim 1, wherein the electrically conductive pathways comprise conductive links extending through apertures between the first and second conductive layers.

9. The sensor of claim 1, wherein the intervening layer comprises a binder and wherein the electrically conductive pathways comprise conductive particles suspended in the binder and extending between the first and second conductive layers.

10. The sensor of claim 1, wherein the thickness of the first conductive layer is substantially identical to a thickness of the second conductive layer.

11. The sensor of claim 1, wherein the substrate comprises polyethylene terephthalate.

12. The sensor of claim 11, further comprising an overlayment layer, the electrodes disposed between the substrate and the overlayment layer.

13. The sensor of claim 12, wherein the overlayment layer comprises polyethylene terephthalate or glass.

14. The sensor of claim 1, wherein the electrodes are diposed in a honeycomb pattern.

15. The sensor of claim 1, wherein the electrodes are disposed on the substrate to form an electrode matrix.

16. The sensor of claim 1, further comprising a display, and wherein the sensor is disposed upon the display such that elements appearing on a viewing screen of the display may be seen through the sensor.

* * * * *

UNITED STATES PATENT AND TRADEMARK OFFICE
CERTIFICATE OF CORRECTION

| | | |
|---|---|---|
| PATENT NO. | : 8,730,184 B2 | Page 1 of 1 |
| APPLICATION NO. | : 12/639363 | |
| DATED | : May 20, 2014 | |
| INVENTOR(S) | : Manoj Nirmal | |

It is certified that error appears in the above-identified patent and that said Letters Patent is hereby corrected as shown below:

In the Specification

<u>Column 6</u>
Line 55, delete "napthalate" and insert -- naphthalate --, therefor.

Line 66, delete "polytetrafluoroethyloene" and insert -- polytetrafluoroethylene --, therefor.

<u>Column 7</u>
Line 62, delete "then" and insert -- than --, therefor.

In the Claims

<u>Column 12</u>
Line 39, in Claim 14, delete "diposed" and insert -- disposed --, therefor.

Signed and Sealed this
Twenty-sixth Day of May, 2015

Michelle K. Lee
*Director of the United States Patent and Trademark Office*